Dec. 11, 1951  P. E. HART  2,578,424
FISHHOOK HOLDER
Filed May 7, 1947
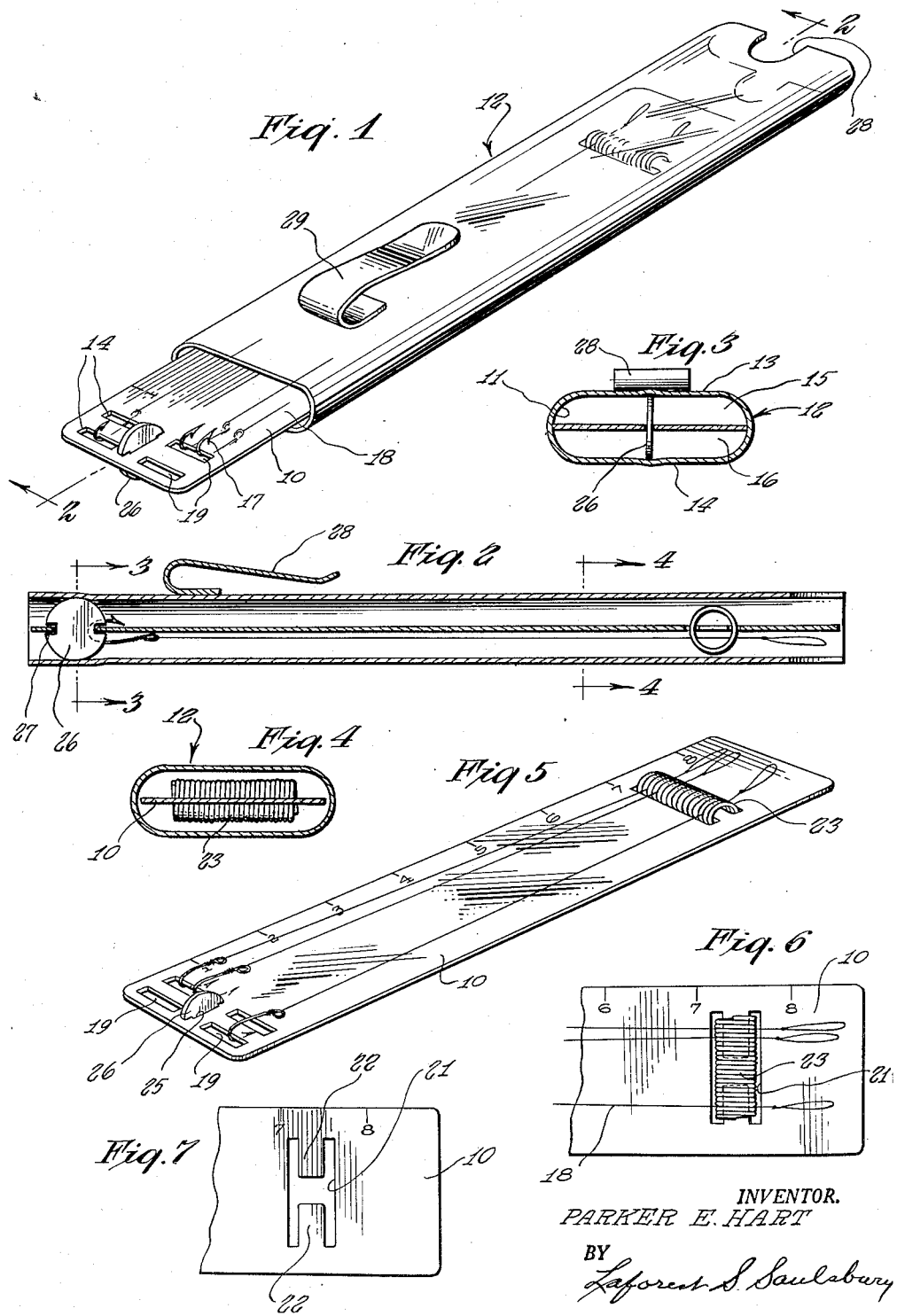
INVENTOR.
PARKER E. HART
BY Laforest S. Saulsbury
ATTORNEY Patented Dec. 11, 1951

2,578,424

UNITED STATES PATENT OFFICE 2,578,424

FISHHOOK HOLDER

Parker E. Hart, New York, N. Y.

Application May 7, 1947, Serial No. 746,577

1 Claim. (Cl. 43—57.5)

This invention relates to fish hook holders or containers for use by the fisherman when on a fishing trip.

It is an object of the present invention to provide a handy and easily accessible fish hook holder for use by the fisherman and wherein the hooks and their snells will be retained in a straight position at all times without becoming snarled and wherein there is provided a casing adapted to receive the holder and from which the holder is extended to gain access to the hook.

It is another object of the present invention to provide an elongated fish hook holder adapted to be fitted into a casing so shaped as to engage the flat holder only at its round side edges whereby to maintain the holder spaced from the casing wall at opposite sides to keep the hooks from interfering with the inner face of the wall of the container as the holder is inserted and removed from the casing.

It is another object of the present invention to provide a friction means at one end of the holder which will bear against the inner face of the casing whereby to retain the holder against sliding movement and rejection from the casing except by the application of force to one end of the holder.

Other objects of the present invention are to provide a fish hook holder or container which is of simple construction, inexpensive to manufacture and convenient to use.

For other objects and for a better understanding of the invention, reference may be had to the following detailed description taken in connection with the accompanying drawing, in which:

Fig. 1 is a perspective view of my fish hook holder or container wherein the holder with the hooks thereon has been extended from the tubular casing, Fig. 2 is a longitudinal cross-sectional view taken on line 2—2 of Fig. 1 with the holder extended into the casing and retained therein by a disc engaging with the top and bottom faces of the casing, Fig. 3 is a cross-sectional view taken on line 3—3 of Fig. 2, Fig. 4 is a cross-sectional view taken on line 4—4 of Fig. 2 and looking upon the wire coils for clasping the snells extending from the hook, Fig. 5 is a perspective view of the holder on which the hooks are mounted entirely removed from its supporting casing, Fig. 6 is a fragmentary view of the holder looking in plan upon the spring adapted to contain the snells, Fig. 7 is a fragmentary view similar to Fig. 6 showing an H-shaped slot with the projections for retaining the wire snell retaining coil.

Referring now to the figures, 10 represents a flat rigid hook holder piece, preferably formed of plastic material, and having side edges adapted to engage with the inner walls of rounded sides 11 of a flattened tubular casing 12 formed of slightly yieldable material, preferably plastic and transparent. The holder 10 is of such width as to permit the easy sliding movement of the holder into the casing 12 but at the same time such that the inner end faces 11 will at all times retain the holder 10 spaced from the parallel sides 13 and 14 of the casing. Compartments 15 and 16 are accordingly provided for receiving fish hooks 17 and their snells 18.

At one end of the holder 10 are openings 19 into which hooks 17 are extended. Near the opposite end of the holder piece 10 there is provided an H-shaped slot 21 having projections 22 over which opposite ends of a coil spring 23 are extended. The coil spring will accordingly extend from opposite faces of the piece 10 and the snells 18 can be extended between adjacent coils of the spring whereby to retain the hook and snell in a taut condition over the holder piece. Since the slots 19 are accessible from opposite sides of the piece 10 and the spring 23 extends to opposite sides, the hooks can be disposed on either side of the piece.

Between pairs of slots 19 and at the one end of the piece 10 is a longitudinally-extending slot 25 into which there is extended a circular disc 26. To retain the disc in the ends of the slot 25 there are provided notches 27 in the disc. The disc 26 is forced into place within the slot 25 so that the notches receive the respective ends of the slot. The length of the slot 25 and of the notches 27 of the disc 26 are such that with slight pressure after one notch has been fitted over one end of the slot the other notch can be fitted over the other end of the slot. The diameter of the disc 26 is such that it will engage the inner faces of the opposite sides 13 and 14 to frictionally retain the holder piece 10 within the casing 12. In order to maintain this frictional engagement the sides 13 and 14 are slightly expanded as shown in Fig. 3. At the opposite end of the casing 12 from which the disc 26 is received, recesses 27 are provided into which a finger can be inserted to force the holder piece 10 through the casing 12 to disengage the disc 26 from the sides 13 and 14. Thereafter the holder piece 10 will be free and can be easily removed from the casing 12 for access to the hooks 17.

On the holder piece 10 there may be located scale indications by which the length of a fish may be determined. A clip 28 is provided on one side of the casing 12 by which the fish hook holder or container can be carried on a strap or belt or in a pocket with safety.

It should now be apparent that there has been provided a fish hook holder which will keep the fish hooks and their snells in straight and extended positions and wherein the holder piece on which these fish hooks are mounted can be readily made accessible to the fisherman from a tubular casing so shaped as to guide the side edges of the holder piece and keep the same centered within the casing and in compartments formed at opposite sides of the holder piece and well protected by the casing.

While various changes may be made in the detail construction, it shall be understood that such changes shall be within the spirit and scope of the present invention as defined by the appended claim.

I claim:

A fish hook holder comprising a holder piece of rigid material and having side edges, the holder piece having means by which hooks can be fastened to it and their snells secured at their ends removed from the hooks, a casing of tubular stock having rounded internal side faces adapted to receive the side edges of the holder piece whereby to retain the holder piece within the casing and to guide its movement through the casing, said casing having opposing top and bottom internal faces, and means secured to the holder piece and extending between the holder piece and the interior of the casing to slightly expand the top and bottom internal faces to retain the holder piece therewithin against axial adjustment, said means for retaining the holder piece against axial adjustment within the casing comprising a disc secured to the holder piece to extend from opposite sides thereof and adapted to have its opposite side edges engage respectively with said opposite top and bottom faces of the casing, said holder piece having an elongated slot, said disc having diametrically opposite notches adapted to receive upon application of slight pressure portions of the holder piece defining the elongated slot whereby the disc may be retained on the holder piece.

PARKER E. HART.

REFERENCES CITED

The following references are of record in the file of this patent:

UNITED STATES PATENTS

| Number | Name | Date |
| --- | --- | --- |
| 885,511 | Newsome | Apr. 21, 1908 |
| 1,187,692 | Woods | June 20, 1916 |
| 1,807,346 | Schneggenburger | May 26, 1931 |
| 1,888,304 | Bekeart | Nov. 22, 1932 |
| 1,934,748 | Swanberg | Nov. 14, 1933 |
| 2,192,408 | Lux | Mar. 5, 1940 |
| 2,201,653 | McCreary | May 21, 1940 |